United States Patent Office.

W. A. PHILLIPS, OF PERRY CENTRE, NEW YORK.

Letters Patent No. 80,660, dated August 4, 1868.

IMPROVED COMPOUND FOR DESTROYING INSECTS ON PLANTS.

*The Schedule referred to in these Letters Patent and making part of the same.*

TO ALL WHOM IT MAY CONCERN:

Be it known that I, W. A. PHILLIPS, of Perry Centre, in the county of Wyoming, and State of New York, have invented a new and improved Composition for Destroying Insects upon Hop-Vines and other Plants; and I do hereby declare that the following is a full, clear, and exact description thereof, which will enable those skilled in the art to make and use the same.

My invention has for its object to furnish an improved composition for destroying lice and other insects upon hop-vines and other plants, which shall be composed of ingredients easily obtained, prepared, and applied, and which shall at the same time be effectual in accomplishing its object and harmless to the vines or plants; and it consists of the composition prepared of the ingredients and in the proportions and manner hereinafter more fully described.

In preparing my improved composition, I put two pounds of tobacco, one quart of lime, and one quart of good soft soap in a barrel of water.

The mixture is then boiled, is afterward allowed to settle, and is then strained, when it is ready for use.

The composition thus prepared may be applied to the vines or plants by means of a force-pump and hose, syringe, watering-pot, or in any other convenient manner, and will entirely destroy the insects without in the least injuring the vines or plants.

I claim as new, and desire to secure by Letters Patent—

The composition prepared of the ingredients and in the proportions and manner substantially as herein described and set forth.

W. A. PHILLIPS.

Witnesses:
   JASON BLAKESLY,
   GEO. A. SWEET.